United States Patent [19]

Marmo

[11] 4,184,959

[45] Jan. 22, 1980

[54] SLUDGE RECOVERY APPARATUS

[75] Inventor: Anthony R. Marmo, Cheswick, Pa.

[73] Assignee: Westinghouse Electric Corp., Pittsburgh, Pa.

[21] Appl. No.: 878,551

[22] Filed: Feb. 16, 1978

[51] Int. Cl.$^2$ .............................................. B01D 17/00

[52] U.S. Cl. ........................................ 210/179; 34/60; 34/185; 34/DIG. 6; 210/182; 210/294; 210/360 R; 233/11

[58] Field of Search ............... 210/519, 520, 178, 179, 210/294, 298, 304, 78, 182; 233/7, 8, 58, 60, 17, 19, 39, 4, 42, 11; 34/60, 185, DIG. 6, 236, 58; 432/138

[56] References Cited

U.S. PATENT DOCUMENTS

| | | | |
|---|---|---|---|
| 239,222 | 3/1881 | Burgess | 210/78 |
| 1,770,970 | 7/1930 | Colby | 432/138 |
| 2,931,882 | 4/1960 | Strauss | 34/60 |
| 3,419,210 | 12/1968 | Schneider et al. | 233/7 |

FOREIGN PATENT DOCUMENTS

| | | | |
|---|---|---|---|
| 174895 | of 1904 | Fed. Rep. of Germany | 34/185 |

*Primary Examiner*—Frank Sever
*Attorney, Agent, or Firm*—J. R. Campbell

[57] ABSTRACT

Described is a sludge recovery apparatus in which influent is admitted downwardly via a vertical motor-driven dual-speed hollow coaxial drive shaft assembly into a hollow open-bottom downwardly-converging cone-shaped centrifugal separator member spun by the outer shaft of such assembly, where liquid from the influent leaves at the top and sludge from the influent is scraped from the inner wall of the separator member for gravity discharge at the bottom by a spiral-shaped scraper spun by the inner shaft of such assembly at a slightly different speed than the separator member. Sludge thus dislodged from such member drops onto a radiantly-heated continuously-rotated drying table having a discharge scraper station and automatic drop doors for gravity ejection of the table-dried sludge into an open-top sludge salvage container.

2 Claims, 2 Drawing Figures

SLUDGE RECOVERY APPARATUS

BACKGROUND OF THE INVENTION

1. Field of the Invention

Sludge recovery apparatus.

2. Description of the Prior Art

One of the more critical areas, in a nuclear fuel fabrication cycle is the recovery of sludge from a grinding operation of the fuel pellets.

The current method of sludge recovery employs a bowl centrifuge to separate liquid from solid. The bowl is manually removed from the drive mechanism. The sludge is hand scraped from the bowl into a pan for drying and subsequent oxidation for recycle. This technique is undesirable with respect to satisfying recycle fuels plant requirements and may also fail to comply with critically-safe-geometry requirements.

SUMMARY OF THE INVENTION

The apparatus as set forth in the preceding abstract is unique and provides for automatic separation of sludge from the grinder coolant, drying of such sludge into a flowable powder, and transfer of the dry powder to a salvage container. It can be constructed to comply with critically-safe-geometry requirements and to obviate need for operating personnel at its immediate site.

DETAILED DESCRIPTION OF THE INVENTION

Figure 1:
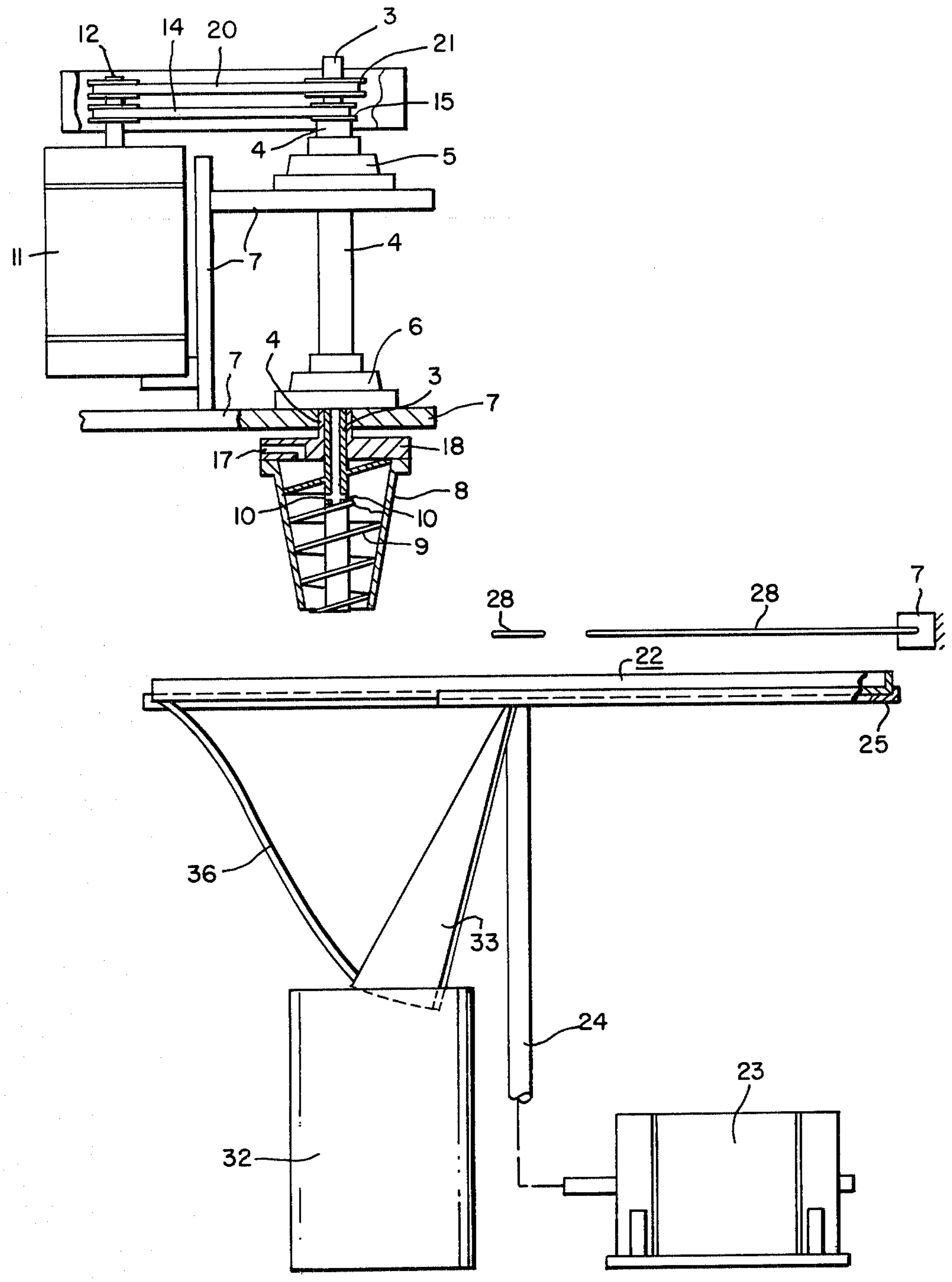
FIG. 1 is an elevation view of the sludge recovery apparatus of the present invention shown schematically; and, FIG. 2 is an isometric three-dimensional view of the apparatus of FIG. 1.
Figure 2:
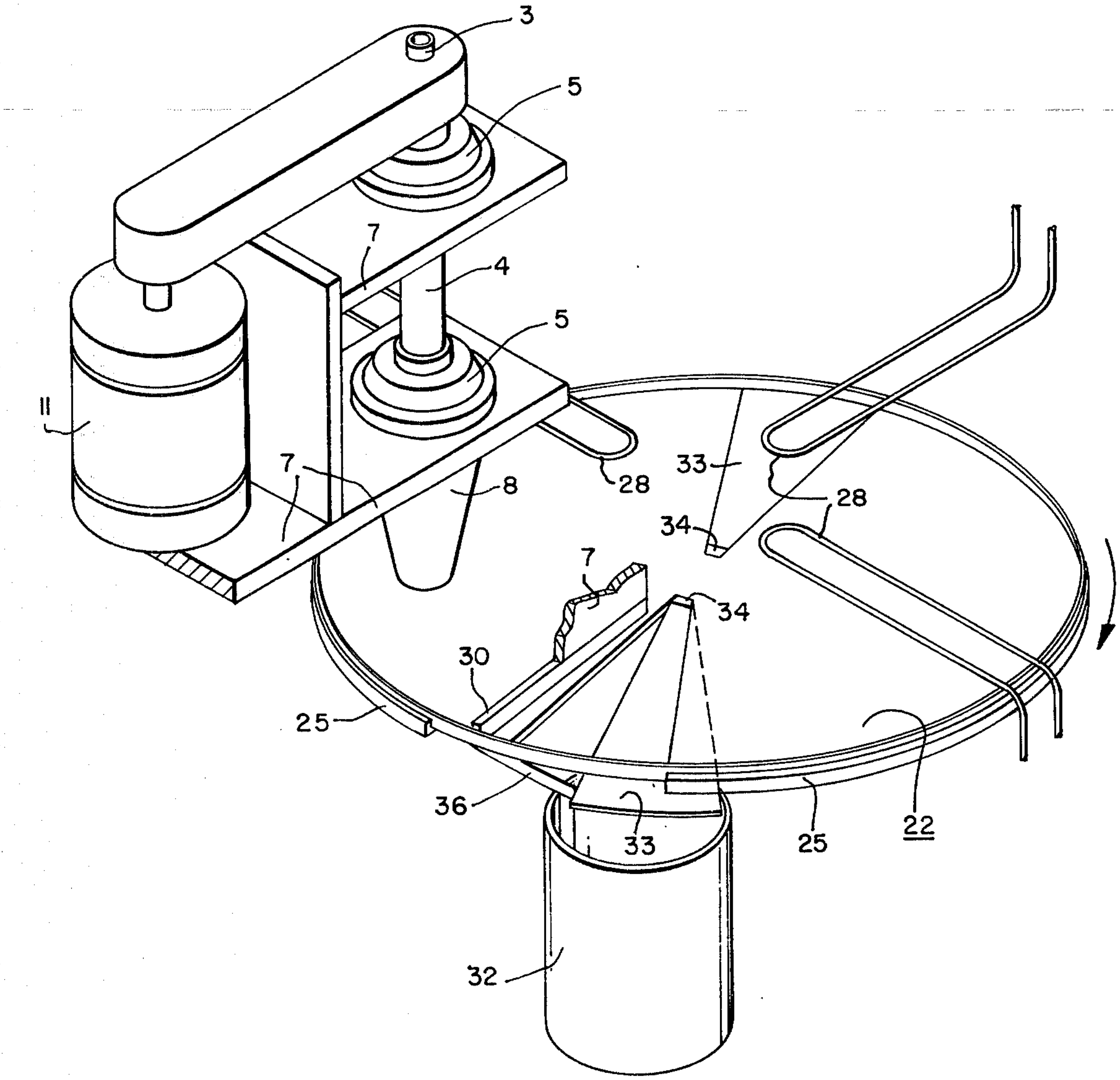

Referring to the drawings, the sludge recovery apparatus of the present invention comprises a pair of coaxial drive shafts 3 and 4 supported for friction-free rotation by spaced-apart bearing means 5 and 6 mounted on a support structure 7. The outer shaft 4 carries a hollow open-bottom downwardly-converging cone-shaped centrifugal separator member 8 at its lower end, and the inner shaft 3 carries a cone-shaped spiral scraper 9 in sliding engagement with the inner wall of the member 8. Shaft 3 is hollow to permit downward flow of influent from its upper open end to the interior of the separator member 8 at its lower end. Port means 10 in such shaft permits such access to the interior of member 8 from the interior of shaft 3.

The outer shaft 4, which drives the separator member 8, is driven by an electric motor 11 mounted on support structure 7 by way of a drive pulley 12, a flexible belt 14, and a driven pulley 15. The speed of the motor 11 and the pulley drive ratio may be such that the separator member 8 is spun at a relatively high velocity to cause the grinding coolant fluid from the influent to separate out and travel by centrifugal force up the diverging wall of the separator member 8 to an exit port means 17 in a cover member 18 and the heavier sludge from such influent to deposit on such wall.

The inner shaft 3 carrying the cone-shaped spiral scraper 9 is driven by the same motor 11 at a slightly different speed than that of the separator member 8 through the medium of the drive pulley 12, a drive belt 20, and a driven pulley 21 of slightly different diameter than that of the driven pulley 15 for the shaft 4. This differential in spin speed between the separator member 8 and the spiral scraper 9 results in sufficient relative turning movement between the two to effect scraping of the centrifugally-deposited sludge from the inner wall of such member 8 and ejection of the sludge (not shown) out from the open bottom of such separator member.

Disposed below the open bottom of the separator member 8 is a sludge drying table 22 adapted to be turned continuously by an electric motor 23 through the medium of a central drive shaft 24 extending downwardly from the bottom of such table. The table finds rotary support at its outer rim by an angle iron ring 25 which includes anti friction bearing means (not shown). The outer rim of the table 22 includes an upstanding flange 26 to assist in retention of sludge discharged onto the rotating table top from the separator member 8. Disposed above the top of table 22 in radiant exposure thereto are a plurality of electric resistance heater elements 28 secured to portions of the support structure 7 at circumferentially distributed sites around such top. The sludge exuded from the separator member 8 onto the top of table 22 thus is dried into what may be a powdery form by the heating elements 28 during turning of such table in a direction away from the underside of member 8 toward a dried sludge discharge station adjacent to a fixed position sludge scraper member 30. The scraper member slidably cooperates with the upper surface of the table 22 to loosen and gather the dried sludge deposited thereon at the discharge station site.

To provide for automatic gravity ejection of the dried powdered sludge from the top of table 22 into a sludge salvage container 32 at the discharge station site, the table top is provided with several drop doors 33 that remain in raised positions flush with the table top by sliding support at their outer ends with the angle iron support ring 25 until they reach the rotary position of the table in which these doors, one at a time, arrives at the discharge station site. Whereupon, by virtue of a circumferential region at such site in which the support ring 25 is absent, the door 33 drops downwardly from a support hinge 34 to dump the scraper-30-gathered dried and powdered sludge into such container 32. Continued rotary movement of the table 22, through the medium of the hinges 34 thereon, causes the outer edge of the downwardly tilting discharge door 33 to slide upwardly along a fixed ramp 36 again to its raised position flush with the top of the table and in sliding support with the outer ring The foregoing description sets forth what is presently contemplated as the preferred embodiment of the invention. It will be appreciated, however, that minor modifications of the invention may be made without departing from the spirit and scope of such invention.

What is claimed is:

1. Sludge recovery apparatus comprising:
   - a frame supporting a motor arranged to drive a pair of vertically disposed concentric hollow shafts at different speeds;
   - a centrifuge connected to the bottom of said shafts;
   - said centrifuge comprising a support through which said shafts project, the outer of said shafts terminating in a plate, and a downwardly converging hollow conical separator member having an open discharge end attached to the bottom of said plate;

means supporting the inner of said hollow shafts in said plate and thus positioning it centrally in the conical separator member;

at least one radially directed orifice in said inner shaft through which sludge-containing liquid influent flows into the conical separator member;

scraper means in said conical member having a surface engagable with the inner surface of the conical member for dislodging sludge solids therefrom and displacing same through the open discharge end;

an opening in said plate spaced inwardly from the inner wall of the separator member for receiving liquid effluent separated from the sludge and discharging it from the separator member;

a rotatable drying table beneath said separator member arranged to receive said sludge solids from the member;

means for rotating the table under the separator member; a hinged drop door in said table top, and means for automatically effecting dropping and raising of said hinged drop door sequentially while turning with said table through said station, and heating means above the table for drying the solids prior to discharging the same by gravity into a container;

whereby as sludge-containing liquid influent is admitted to the conical separator member through said orifice and the separator member rotated to separate liquids from solids, liquid effluent from the separator member is discharged through the plate opening, while the scraper means is rotated to remove sludge solids from the separator member inner surface and discharge the solids onto said table to be dried prior to further discharging the dried solids into a container.

2. The sludge recovery apparatus of claim 1, wherein said rotatable table includes a table top scraper at a sludge discharge station located above said container.

* * * * *